(12) United States Patent
Konen

(10) Patent No.: US 6,473,925 B1
(45) Date of Patent: Nov. 5, 2002

(54) HAND-HELD WIRE CUTTER WITH ENLARGED GRIPPING SURFACE

(75) Inventor: Bruce P. Konen, Aurora, IL (US)

(73) Assignee: Ideal Industries, Inc., Sycamore, IL (US)

( * ) Notice: Subject to any disclaimer, the term of this patent is extended or adjusted under 35 U.S.C. 154(b) by 0 days.

(21) Appl. No.: 09/670,324

(22) Filed: Sep. 27, 2000

(51) Int. Cl.$^7$ .................................................. B25F 1/00
(52) U.S. Cl. ................................ 7/107; 7/158; 81/9.44
(58) Field of Search ........................... 7/107, 129, 132; 81/9.4, 9.44; 30/90.1, 90.4, 90.6, 146, 294

(56) References Cited

U.S. PATENT DOCUMENTS

| | | |
|---|---|---|
| 669,556 A | 3/1901 | Spring |
| 777,412 A | 12/1904 | Hamel et al. |
| 785,392 A | 3/1905 | Williams |
| 788,454 A | 4/1905 | Montgomery et al. |
| 880,790 A | 3/1908 | Goehst |
| 1,305,513 A | 6/1919 | Bernard |
| 1,388,398 A | 8/1921 | Adams |
| 1,771,733 A | 7/1930 | Ott |
| 1,939,574 A | 12/1933 | Saylor |
| 2,054,973 A | 9/1936 | Ferguson |
| 2,594,363 A | 4/1952 | Stephenson |
| 3,447,172 A | 6/1969 | Clark |
| 3,703,840 A | 11/1972 | Kauf |
| 3,710,406 A | 1/1973 | Stanford |
| 3,810,307 A | 5/1974 | Mongredien |
| 3,902,206 A | * 9/1975 | Naquin ........................... 7/107 |
| 3,928,878 A | 12/1975 | Van Heuman |
| 4,104,752 A | 8/1978 | Amrein et al. |
| 4,607,544 A | * 8/1986 | Jewell, Jr. ...................... 81/9.4 |
| 4,651,598 A | 3/1987 | Warheit |
| 4,662,252 A | 5/1987 | Warheit |
| 4,735,117 A | 4/1988 | Ducret |
| 5,168,592 A | 12/1992 | Jee |
| 5,206,996 A | 5/1993 | McDaniel |
| 5,497,522 A | 3/1996 | Chen |
| 5,711,182 A | * 1/1998 | Yang ........................ 72/409.14 |
| 5,724,688 A | * 3/1998 | Chen ............................. 7/128 |
| 5,732,471 A | 3/1998 | Korinek et al. |
| 5,862,552 A | * 1/1999 | Koelewyn ...................... 7/132 |
| 5,894,617 A | * 4/1999 | Liou ............................. 7/107 |

* cited by examiner

Primary Examiner—Joseph J. Hail, III
Assistant Examiner—David B. Thomas
(74) Attorney, Agent, or Firm—Cook, Alex, McFarron, Manzo, Cummings & Mehler, Ltd.

(57) ABSTRACT

A hand-held wire stripper comprising a first elongated member, a second elongated member and a spacer. The first elongated member has a handle portion and a jaw portion. The second elongated member has a handle portion and a jaw portion. The second elongated member is pivotably connected to the first elongated member which allows the jaw portion of the first elongated member and the jaw portion of the second elongated member to move between an opened position and a closed position. The jaw portion of the first elongated member has a cutting surface for cutting an electrical wire, at least one semi-circular notch for stripping an electrical wire and a gripping surface for gripping an electrical wire. The jaw portion of the second elongated member has a gripping surface for gripping an electrical wire. The spacer has a gripping surface for gripping an electrical wire. The spacer is attached to the end of the jaw portion of the first elongated member or the end of the jaw portion of the second elongated member.

18 Claims, 2 Drawing Sheets

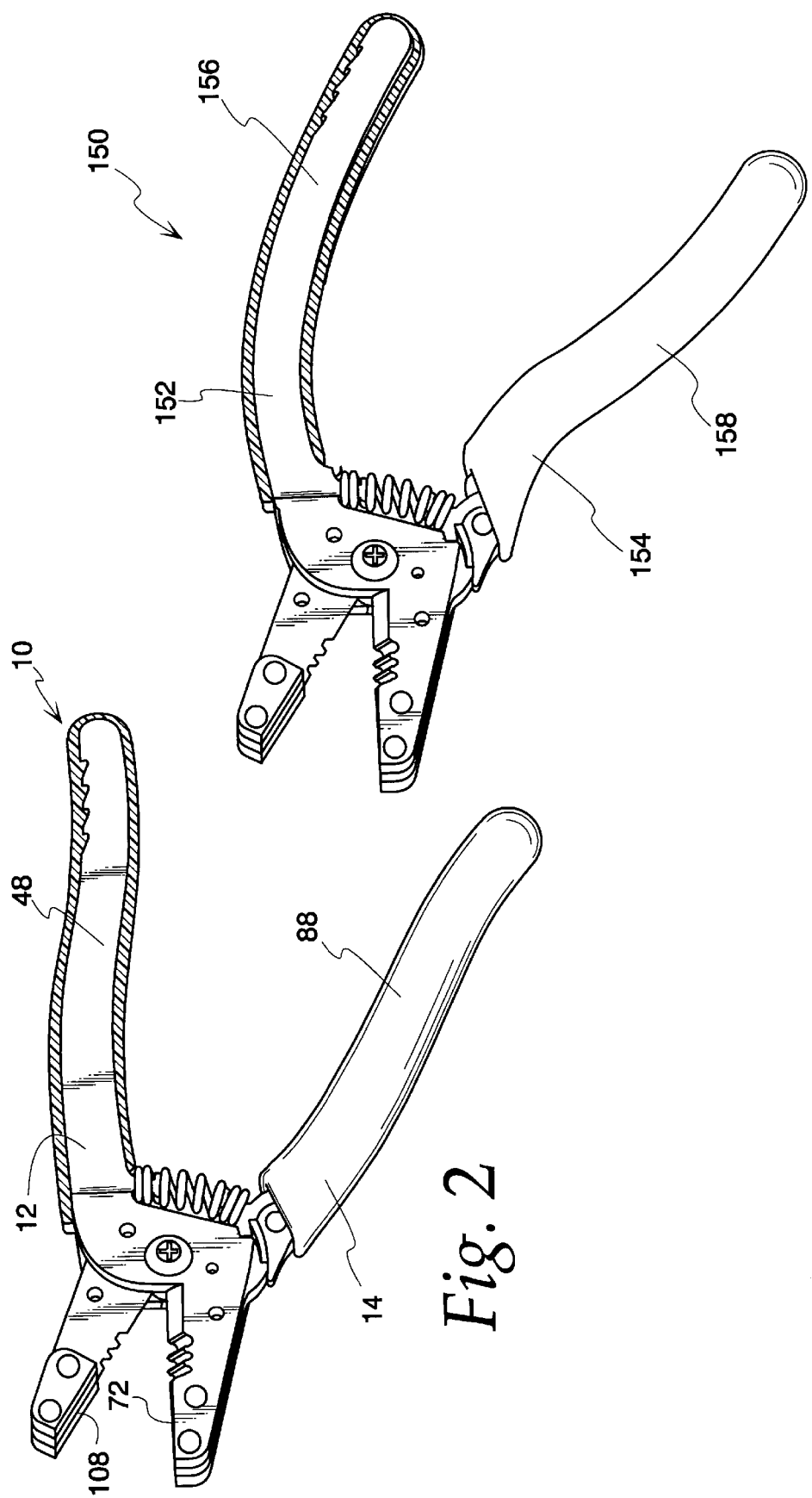

HAND-HELD WIRE CUTTER WITH ENLARGED GRIPPING SURFACE

BACKGROUND OF THE INVENTION

This invention relates generally to a multi-function electrician's tool, and, more particularly, to a light weight, hand-held wire stripper having an enlarged nose providing an improved gripping surface. While the term wire stripper is used herein to describe the hand tool, it will be understood that functions (such as wire cutting and looping) other than just wire stripping can be incorporated into the tool. The term wire stripper is not to be construed as limiting the tool to just the stripping function.

Wire strippers are typically used by electricians to cut and strip electrical wires. Since this is a task performed relatively frequently it is desirable to have a cutting and stripping tool that is light weight and readily fits in a tool belt, pouch or pocket. It is also common practice for the electrician to twist two or more stripped wires together prior to inserting the stripped wires into a wire connector. However, the blades of a typical prior art wire stripper are formed of relatively thin metal stampings to save weight. Accordingly the prior art light weight wire stripper has a narrow thickness that provides only a small gripping surface at its nose for gripping the wires during the twisting process. Some electricians work around this disadvantage of the light weight tool by using a second tool for twisting, something having a wider nose such as a pliers. Alternatively, a pliers with thicker blades and a wider nose could have cutting and stripping surfaces formed therein but this results in a much heavier tool. Hence, there exists a need for a single, light weight, hand-held tool capable of cutting, stripping and twisting electrical wires.

Another problem with prior art light weight wire strippers is the elongated, thin stampings are prone to damage due to bending, especially considering the manner in which these tools are typically handled, stored and used. Hence, there exists a need for a light weight wire stripper having increased bending strength.

SUMMARY OF THE INVENTION

The present invention relates to a hand-held wire stripper comprising a first elongated member, a second elongated member and a spacer. The first elongated member has a handle portion and a jaw portion. The second elongated member has a handle portion and a jaw fit portion. The second elongated member is pivotably connected to the first elongated member which allows the jaw portion of the first elongated member and the jaw portion of the second elongated member to move between an opened position and a closed position.

The jaw portion of the first elongated member has a cutting surface for cutting an electrical wire, at least one semi-circular notch for stripping an electrical wire and a gripping surface for gripping an electrical wire. The jaw portion of the second elongated member has a gripping surface for gripping an electrical wire.

The spacer has a gripping surface for gripping an electrical wire. The spacer is attached to the end of the jaw portion of the first elongated member or the end of the jaw portion of the second elongated member.

BRIEF DESCRIPTION OF THE DRAWINGS

FIG. 2 is a perspective view of the hand-held wire stripper of FIG. 1 as assembled.

FIG. 3 is a perspective view of an alternative hand-held wire stripper having ergonomically designed handle portions.

DETAILED DESCRIPTION OF THE INVENTION

Figure 1:
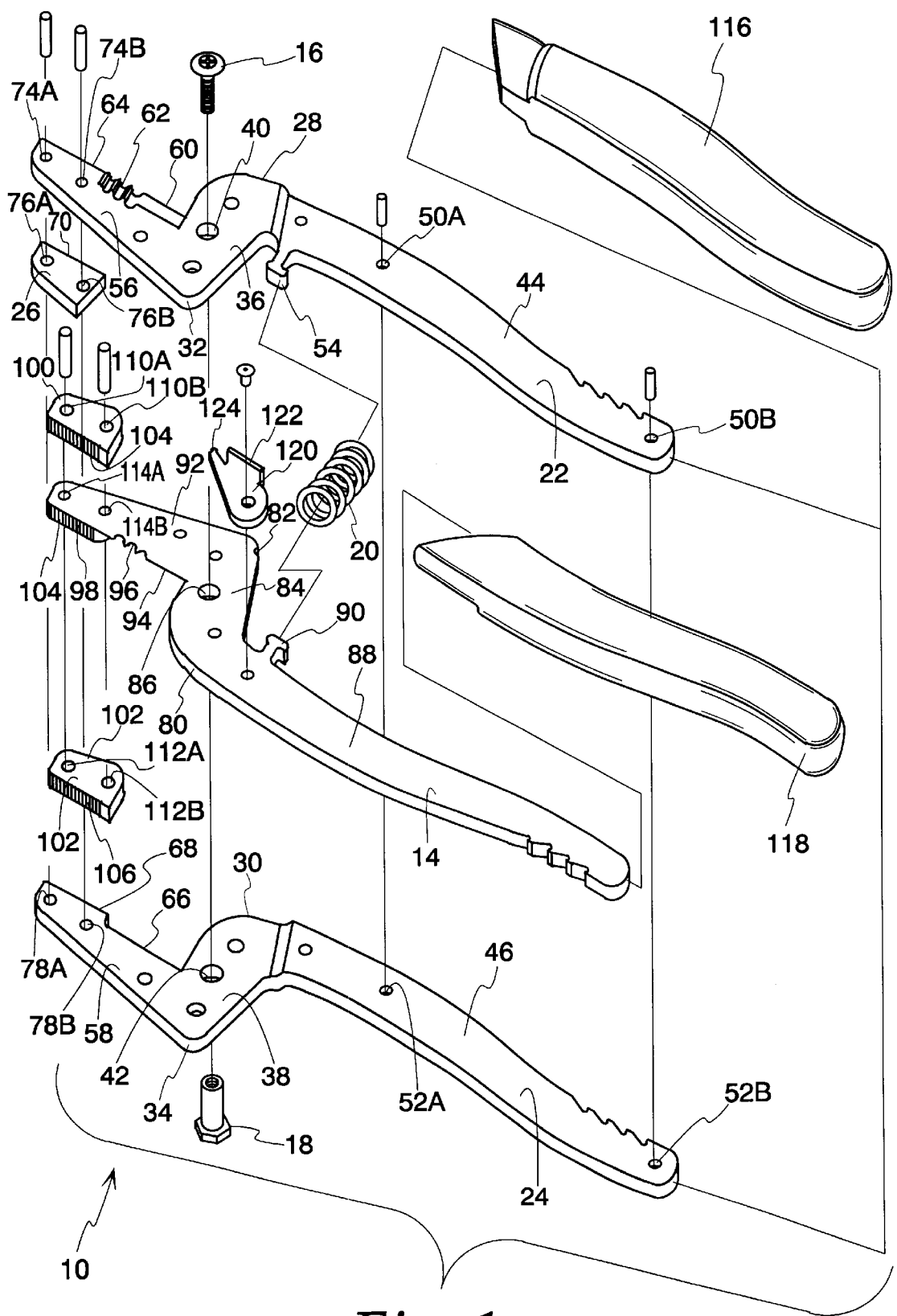
FIG. 1 is an exploded perspective view of the hand-held wire stripper with enlarged gripping surface of the present invention.

FIGS. 1 and 2 illustrate a hand-held wire stripper in accordance to the present invention. The hand-held wire stripper 10 comprises first and second elongated members 12 and 14. A locking screw 16 and pivot bushing 18 pivotably connect the first elongated member 12 to the second elongated member 14. A coil spring 20 biases the first elongated member 12 away from the second elongated member 14.

The first elongated member 12 is formed of a boxed or laminated construction. This boxed or laminated construction provides the first elongated member 12, and thus the wire stripper 10, with increased bending strength. The first elongated member 12 includes a first frame member 22, a second frame member 24 and a grip spacer 26. Each of the frame members 22 and 24 is somewhat Z-shaped. Frame member 22 has a first elbow 28, a second elbow 32 and an intermediate neck portion 36. The neck portion includes a pivot hole approximately mid-way between the first elbow 28 and the second elbow 32. The pivot hole 40 receives the locking screw 16 and the pivot bushing 18. Similarly, frame member 24 has a neck portion 38 located between its first elbow 30 and second elbow 34 with a pivot hole 42 mid-way along the neck 38.

Frame member 22 has a handle portion 44 longitudinally outwardly of the first elbow 28. Frame member 24 has a similar handle 46. Each of the handle portions 44 and 46 is recessed inwardly toward the other, allowing the handle portion 44 of the first frame member 22 to abut the handle portion 46 of the second frame member 24 to form an integral handle portion 48 (FIG. 2). Handle portion 44 has two rivet holes 50A, 50B defined therein while handle 46 has similar holes 52A, 52B. When the handles 44 and 46 are laid in abutting relation to form the integral handle portion 48, the rivet holes 50A and 50B of handle 44 are in line with the rivet holes 52A and 52B of the handle 46. Rivets are used to fix the handles together.

Handle 22 also has a protrusion 54 for receiving one end of the coil spring 20. The protrusion is located a given distance from the first elbow 28 and is directed transversely inwardly toward the second elongated member 12.

Each frame member further includes a jaw portion located longitudinally outwardly of the second elbow. Thus, frame 22 has a jaw 56 while frame 24 has a jaw portion 58. Directly longitudinally outward of the second elbow 32 of the first frame member 22, and located on the inner edge of the jaw portion 56, is a cutting surface 60 forming one edge of a scissor for cutting an electrical wire. Longitudinally outwardly of the cutting surface 60 is a plurality of variously-sized, semi-circular notches 62 forming one edge of a wire stripper. These notches cooperate with similar notches on the other jaw to penetrate and strip electrical insulating material from an electrical wire. The notches are sized to penetrate the insulation while leaving the underlying conductor untouched. Longitudinally outwardly of the semi-circular notches 62 is a nose portion of the jaw, forming a gripping surface 64 for gripping an electrical wire.

Directly longitudinally outwardly of the second elbow 34 of the second frame member 24, and located on the inner edge of the jaw portion 58, is a flat surface 66. Longitudinally outwardly of the flat surface 66 is nose forming a gripping surface 68 for gripping an electrical wire. The gripping surface 68 of the second frame member 24 has a length approximately equal to the length of the gripping surface 64 of the first frame member 22. Furthermore, the gripping surface 68 of the second frame member 24 is located at a distance from the second elbow 34 of the second frame member 24 approximately equal to the distance between the second elbow 32 of the first frame member 22 and the gripping surface 64 of the first frame member 22.

The spacer 26 has a gripping surface 70 at one edge, and is sandwiched between the end of the first frame member 22 and the end of the second frame member 24. The gripping surface 70 of the spacer 26 has a length approximately equal to the length of the gripping surface 64 of the first frame member 22 and the length of the gripping surface 68 of the second frame member 24. The spacer 26 is further shaped similar to the ends of the first frame member 22 and the second frame member 24, such that upon the spacer 26 being sandwiched between the first and second frame members, the end of the first frame member 22, the spacer 26 and the end of the second frame member 24 form an integral enlarged gripping surface 72. Located along the end of the first frame member 22, the spacer 26 and the end of the second frame member 24 are aligned rivet holes 74A/74B, 76A/76B and 78A/78B for receiving rivets for laminating together the end of the first frame member 22, the spacer 26 and the end of the second frame member 24.

To prevent the electrical wire from slipping on the integral enlarged gripping surface 72, the gripping surface 64 of the first frame member 22, the gripping surface 68 of the second frame member 24 and the gripping surface 70 of the spacer 26 have grooves or knurling formed thereon.

The second elongated member is Z-shaped, having a first elbow 80 and a second elbow 82. Located between the first elbow 80 and the second elbow 82 is a neck portion 84. Defined approximately midway between the first elbow 80 and the second elbow 82 is a pivot hole 86 for receiving the locking screw 16 and the pivot bushing 18.

Longitudinally outwardly of the first elbow 80 is a handle portion 88. The length of the handle portion 88 of the second elongated member 14 is approximately equal to the length of the handle portions 44 and 46 of the first elongated member 12. Located a given distance from the first elbow 80 and directed transversely inwardly toward the first elongated member 12 is a protrusion 90 for receiving the other end of the coil spring 20.

Longitudinally outwardly of the second elbow 82 is a jaw portion 92. Directly longitudinally outwardly of the second elbow 82 and located on the inner edge of the jaw portion 92 is a cutting surface 94 forming the other edge of a scissor for cutting an electrical wire. Longitudinally outwardly of the cutting surface 94 is a plurality of variously-sized, semi-circular notches 96 forming the other edge of a wire stripper for cutting and stripping electrical insulating material from an electrical wire. Longitudinally outwardly of the semi-circular notches 96 is a gripping surface 98 for gripping an electrical wire.

Two grip spacers 100 and 102 are attached to the outer surfaces of the end of the jaw portion 92. Each of the grip spacers 100 and 102 has a gripping surface 104 and 106 at one edge. The gripping surface 104 and 106 of each grip spacer 100 and 102 has a length approximately equal to the length of the gripping surface 98 of the second elongated member 14. Each of the grip spacers 100 and 102 is shaped similar to the end of the jaw portion 92, such that, upon the two grip spacers 100 and 102 attached to the outer surfaces of the end of the jaw portion 92, the gripping surfaces 104 and 106 of the two grip spacers 100 and 102 and the gripping surface 98 of the second elongated member 14 form an integral enlarged gripping surface 108. Located along the two grip spacers 100 and 102 and the end of the jaw portion 92 are rivet holes 110A/110B, 112A/112B and 114A/114B for receiving rivets for attaching the two grip spacers 100 and 102 to the end of the jaw portion 92.

To prevent the electrical wire from slipping on the integral enlarged gripping surface 108, the gripping surface 98 of the second elongated member 14 and the gripping surfaces 104 and 106 of the two grip spacers 100 and 102 have grooves or knurling formed thereon.

The wire stripper 10 of the present invention functions as follows. The first elongated member 12 is pivotably connected to the second elongated member 14 such that inward forces applied to the integral handle portion 48 of the first elongated member 14 and the handle portion 64 of the second elongated member 14 closes the wire stripper jaws. The coil spring 70 biases the wire stripper 10 toward the opened position. To connect two electrical wires together, the user would cut the wires to the desired length by inserting one of the wires between the cutting surfaces 60 and 94 of the wire stripper 10 and then closing the wire stripper 10. The user would then strip a given length of electrical insulating material from the electrical wire to expose the metal conductor. To strip the electrical insulating material, the electrical wire is inserted between the desired diameter semi-circular notches 62 and 96 of the wire stripper 10 and then closing the wire stripper 10. The electrical wire is then pulled longitudinally along the axis of the electrical wire to separate the slug of insulating material from the metal wire.

The other electrical wire is similarly cut to length and stripped by the wire stripper. To form an electrical connection between the two electrical wires, the user would place the exposed metal wires of the electrical wire between the enlarged gripping surfaces 72 and 108 of the wire stripper 10 and then close the wire stripper 10. The wire stripper 10 is then rotated about the axis of the electrical wires to twist the exposed metal wires together to form an electrical connection. The wire stripper 10 of the present invention allows the entire process of cutting, stripping and twisting the electrical wires to be performed by a single tool.

Optional features can be added to the hand-held wire stripper 10 of the present invention. The first optional feature is a set of handle sleeves 116 and 118 formed of a polymeric material. The handle portions 48 and 88 of the wire stripper 10 are inserted into the corresponding handle sleeves 116 and 118. The handle sleeves 116 and 118 allow the user to have a more comfortable grip of the wire stripper 10.

Another optional feature which can be added to the hand-held wire stripper 10 of the present invention is a locking latch 120 for locking the wire stripper to a closed position. By allowing the wire stripper 10 to be locked in the closed position, the insulation material can be separated from the metal wire during the stripping step without the user having to constantly apply an inward force on the handle portions 48 and 88. Locking the wire stripper in the closed position is also useful while twisting together the exposed metal wires. Locking the wire stripper in the closed position after the exposed metal wires are inserted between the grip sections allows the user to twist the metal wires together without having to constantly apply an inward force on the handle portions 44 and 88.

The locking latch 120 is pivotably mounted on the second elongated member 14. The locking latch 120 has a latching surface 122 directed toward the first elongated member 12 and a tab 124 located at the distal end. To lock the wire stripper 10 in the closed position, the user would apply an inward force on the handle portions 44 and 88 and rotate the locking latch 120 by pushing the tab 124 toward the first elongated member 12 until the latching surface 122 abuts the first elongated member 12.

FIG. 3 illustrates an alternative embodiment of a wire stripper in accordance with the present invention. The wire stripper 150 of the second embodiment is identical to the wire stripper 10 of the first embodiment with the exception of ergonomically designed handle portions 156 and 158. Such ergonomically designed handle portions 156 and 158 are disclosed in U.S. patent application Ser. No. 09/285,972 assigned to the present assignee and is herein incorporated by reference. The handle portion 156 of the first elongated member 152 is shaped to the palm of the user. The handle portion 158 of the second elongated member 154 is shaped to the fingers of the user. These ergonomically designed handle portions allow the user to comfortably grip the handle portions 156 and 158 of the wire stripper 10.

While a preferred form of the invention has been shown and described, it will be realized that alterations and modifications may be made thereto without departing from the scope of the following claims.

What is claimed is:

1. A hand-held wire stripper comprising:
   a first elongated member having a handle portion and a jaw portion;
   a second elongated member having a handle portion and a jaw portion, the second elongated member being pivotably connected to the first elongated member allowing the jaw portion of the first elongated member and the jaw portion of the second elongated member to move between an opened position and a closed position;
   the jaw portion of the first elongated member having a cutting surface for cutting an electrical wire, at least one semi-circular notch for stripping an electrical wire and a gripping surface for gripping an electrical wire;
   the jaw portion of the second elongated member having a gripping surface for gripping an electrical wire; and
   at least one spacer having a gripping surface for gripping an electrical wire, the spacer attached to the end of jaw portion of one of the first elongated member and the second elongated member.

2. The hand-held wire stripper of claim 1 wherein the jaw portion of the second elongated member has a cutting surface for cutting an electrical wire and at least one semi-circular notch for stripping an electrical wire.

3. The hand-held wire stripper of claim 1 further comprising a second spacer having a gripping surface for gripping an electrical wire, the second spacer attached to the end of the jaw portion of other of the first elongated member and the second elongated member.

4. The hand-held wire stripper of claim 1 wherein two spacers are attached to the end of the jaw portion of one of the first elongated member and the second elongated member.

5. The hand-held wire stripper of claim 1 wherein one of the first elongated member and the second elongated member includes a first frame member and a second frame member, the spacer being located between the first frame member and the second frame member.

6. The hand-held wire stripper of claim 1 further comprising at least one rivet for attaching the spacer to the end of the jaw portion of one of the first elongated member and the second elongated member.

7. The hand-held wire stripper of claim 1 wherein the gripping surface of the jaw of the first elongated member and the gripping surface of the jaw of the second elongated member have grooves formed thereon.

8. The hand-held wire stripper of claim 1 wherein the gripping surface of the spacer has grooves formed thereon.

9. The hand-held wire stripper of claim 1 further comprising a first handle sleeve surrounding the handle portion of the first elongated member and a second handle sleeve surrounding the handle portion of the second elongated member.

10. The hand-held wire stripper of claim 1 further comprising a spring disposed between the handles of the first and second elongated members for biasing the jaw portions toward an opened position.

11. The hand-held wire stripper of claim 10 wherein the spring is a coil spring.

12. The hand-held wire stripper of claim 1 further comprising a locking latch for locking the jaw portions in a closed position.

13. The hand-held wire stripper of claim 12 wherein the locking latch is pivotably mounted on one of the first elongated member and the second elongated member.

14. The hand-held wire stripper of claim 13 wherein the locking latch has a locking surface for abutting the other of the first elongated member and the second elongated member.

15. A hand-held wire stripper comprising:
    a first elongated member including a first frame member and a second frame member, the first frame member having a handle portion and a jaw portion, the second frame member having a handle portion and a jaw portion, the jaw portion of one of the first frame member and the second frame member including a cutting surface for cutting an electrical wire, at least one semi-circular notch for stripping an electrical wire and a gripping surface for gripping an electrical wire;
    a second elongated member having a handle portion and a jaw portion, the second elongated member pivotably mounted to the first elongated member allowing the jaw portions of the first elongated member and the jaw portion of the second elongated member to move between an opened position and a closed position, the jaw portion of the second elongated member including a cutting surface for cutting an electrical wire, at least one semi-circular notch for stripping an electrical wire and a gripping surface for gripping an electrical wire.

16. The hand-held wire stripper of claim 15 wherein the handle portion of the first frame member is attached to the handle portion of the second frame member to form an integral handle portion.

17. The hand-held wire stripper of claim 15 further comprising a spacer located between the jaw member of the first frame member and the jaw member of the second frame member.

18. The hand-held wire stripper of claim 15 further comprising a locking latch privotably mounted on the second elongated member for locking the wire stripper in a closed position.

* * * * *